R. S. SMITH.
MOTOR WHEEL FOR BICYCLES.
APPLICATION FILED AUG. 20, 1914.

1,373,918.

Patented Apr. 5, 1921.
4 SHEETS—SHEET 1.

Witnesses:

Inventor
R. Stanley Smith
By Lynn A. Williams
Attorney

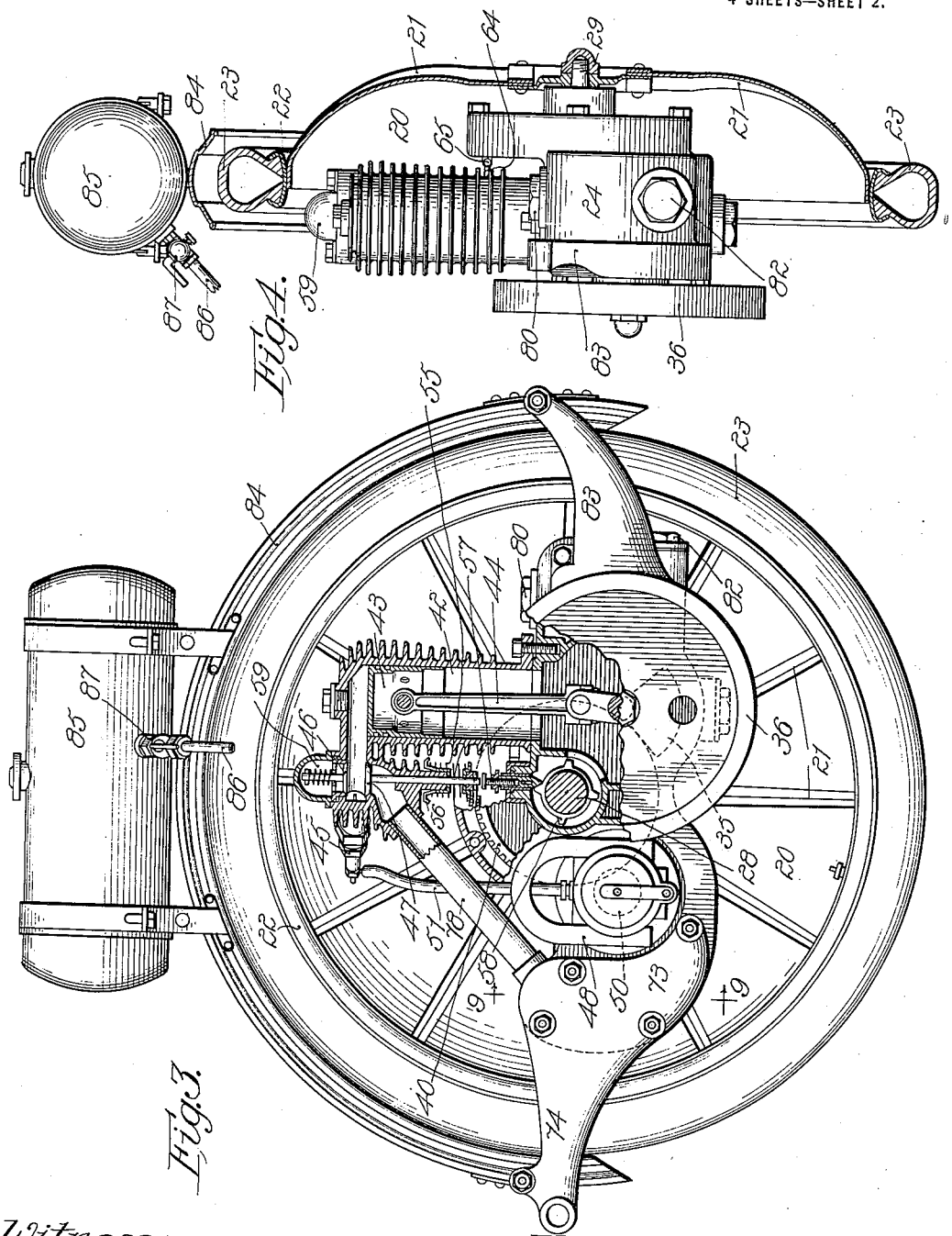

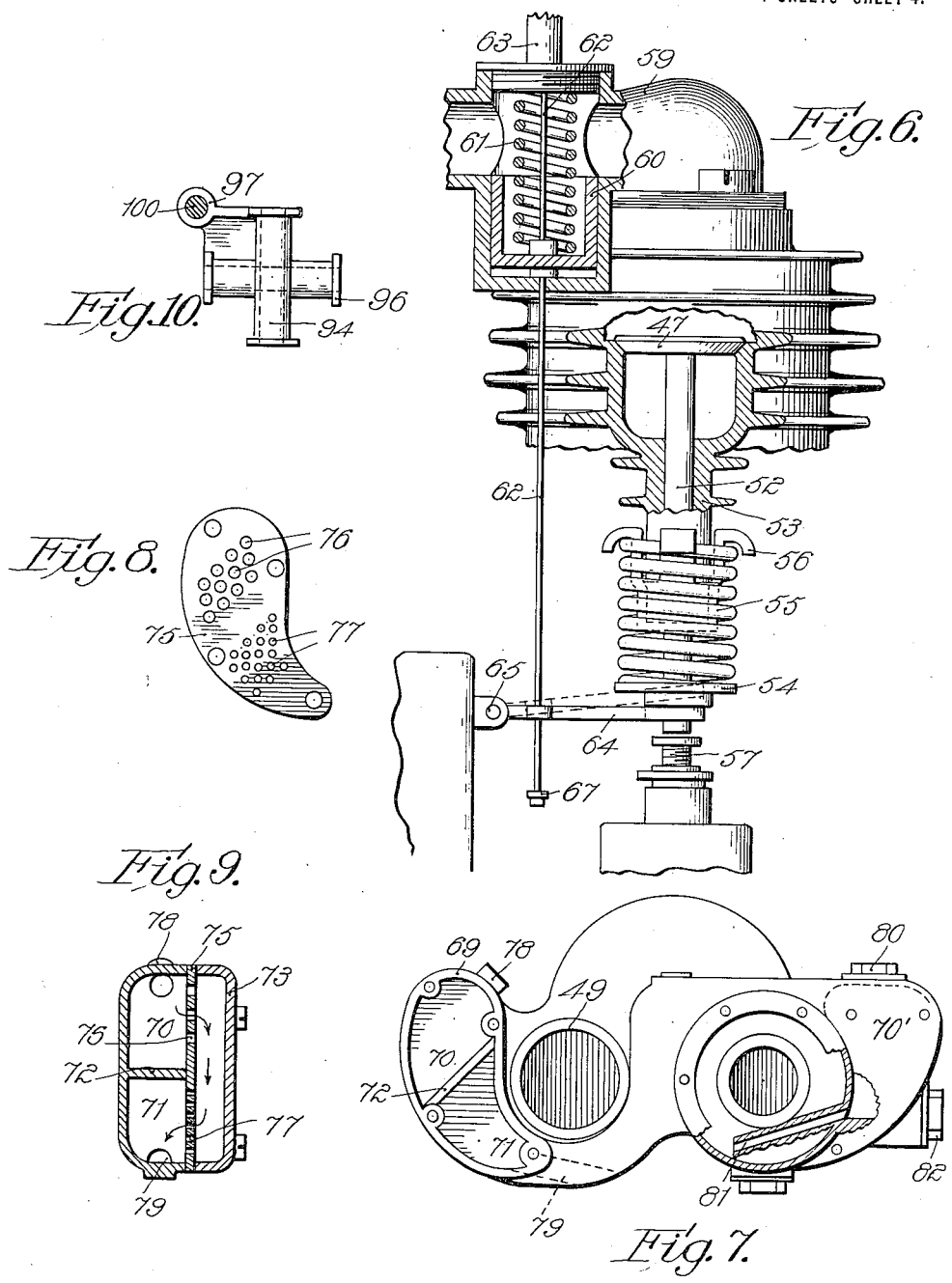

UNITED STATES PATENT OFFICE.

REUBEN STANLEY SMITH, OF MILWAUKEE, WISCONSIN, ASSIGNOR TO BRIGGS & STRATTON COMPANY, OF MILWAUKEE, WISCONSIN, A CORPORATION OF WISCONSIN.

MOTOR-WHEEL FOR BICYCLES.

1,373,918.  Specification of Letters Patent.  Patented Apr. 5, 1921.

Application filed August 20, 1914. Serial No. 857,692.

*To all whom it may concern:*

Be it known that I, REUBEN STANLEY SMITH, a citizen of the United States, residing at Milwaukee, in the county of Milwaukee and State of Wisconsin, have invented a certain new and useful Improvement in Motor Wheels for Bicycles, of which the following is a full, clear, concise, and exact description, reference being had to the accompanying drawings, forming a part of this specification.

This invention relates to a motor wheel.

The motor wheel to which the invention more particularly relates comprises, in general, a traction wheel supporting an internal combustion engine, connected in direct driving relation thereto. The motor wheel by means of connections with its engine frame may be associated with the bicycle or other vehicle to be propelled, and the engine may be controlled from the propelled vehicle.

One of the objects of the invention is to provide an improved motor wheel.

Another object is to so connect a motor wheel with the vehicle to be driven thereby, that the motor wheel may have lateral movement independent of the vehicle.

Another object is to provide improved means for connecting a motor wheel in driving relation to a vehicle to be propelled thereby.

A further object is to so connect a motor wheel with the vehicle to be propelled thereby, as to permit independent vertical and lateral movement of the motor wheel.

Further objects and advantages will hereinafter appear.

The views of the drawings are:—

Fig. 3 is a side elevation, partly in section, of the motor wheel.

Fig. 4 is an end elevation, partly in section, of the motor wheel.

Fig. 6 is an elevation, partly in section, of the throttle valve and exhaust valve and operative mechanism therefor.

Fig. 7 is a side elevation, partly in section, of the engine frame, showing the lubricating mechanism and the muffler.

Fig. 8 is a longitudinal vertical section through the muffler.

Fig. 9 is a transverse vertical section through the muffler.

Fig. 10 shows the double pivoted connection between the motor wheel and the vehicle.

Similar reference numerals refer to similar parts throughout the several views.

Figure 1:
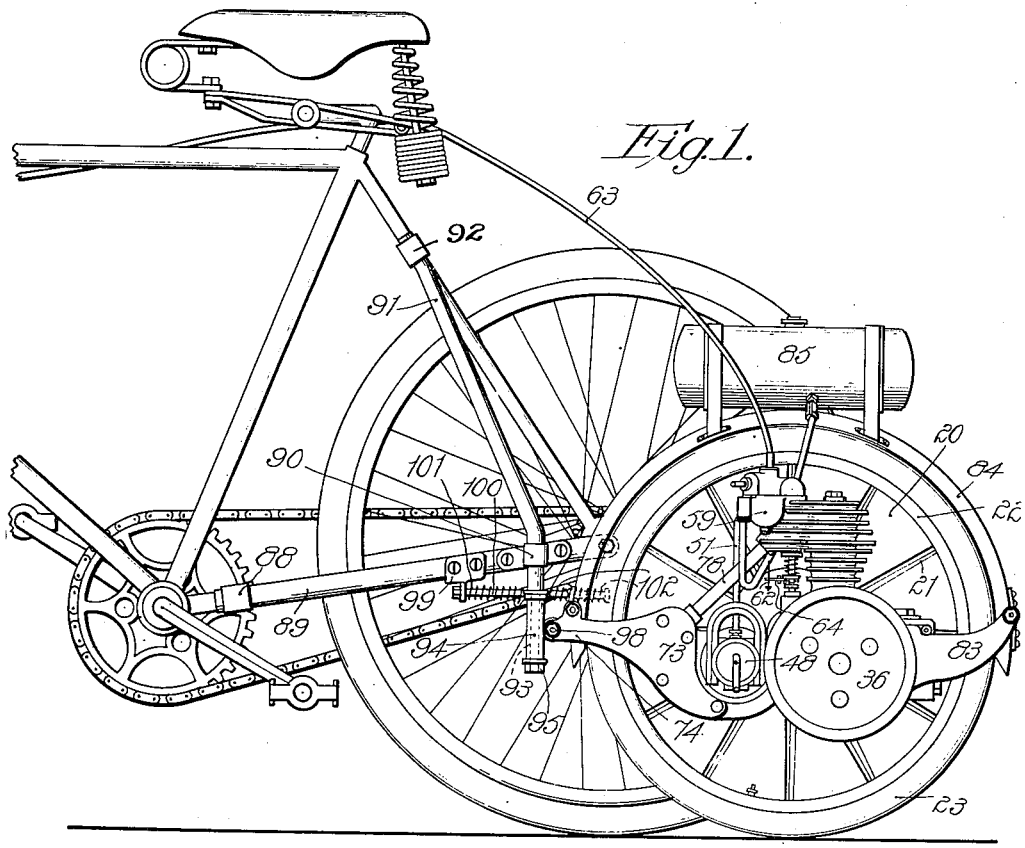
Figure 1 is a side elevation of the motor wheel and a bicycle showing the connections therebetween.
Figure 2:
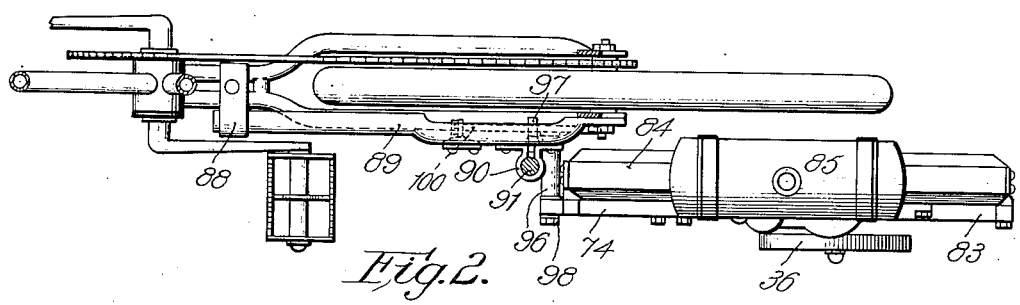
Fig. 2 is a top plan of the motor wheel connected to a bicycle.

Figs. 1 and 2 show a bicycle with a motor wheel connected therewith. The bicycle is preferably of the coaster-break type, in order that the rider may rest his feet upon the pedals when the bicycle is being driven by the pusher; but, it will be understood that my present invention is particularly concerned with the motor wheel and that the particular construction of the bicycle with which it is designed to be associated is immaterial. The improved motor wheel comprises a wheel 20 which is radially dished as most clearly illustrated in Fig. 4, and is provided with a plurality of reinforcing ribs 21. The wheel as illustrated in the drawings is equipped with a rim 22 and a suitable tread, preferably in the form of a pneumatic tire 23.

The engine which serves as the power plant of the motor wheel has a frame 24. Attention is directed to the fact that owing to the dished conformation of the wheel and the location of the engine thus made possible, the center of gravity of the power plant is located directly over that portion of the tread which engages the road and accordingly there is no tendency for the power plant to tip the wheel in either direction.

Figure 5:
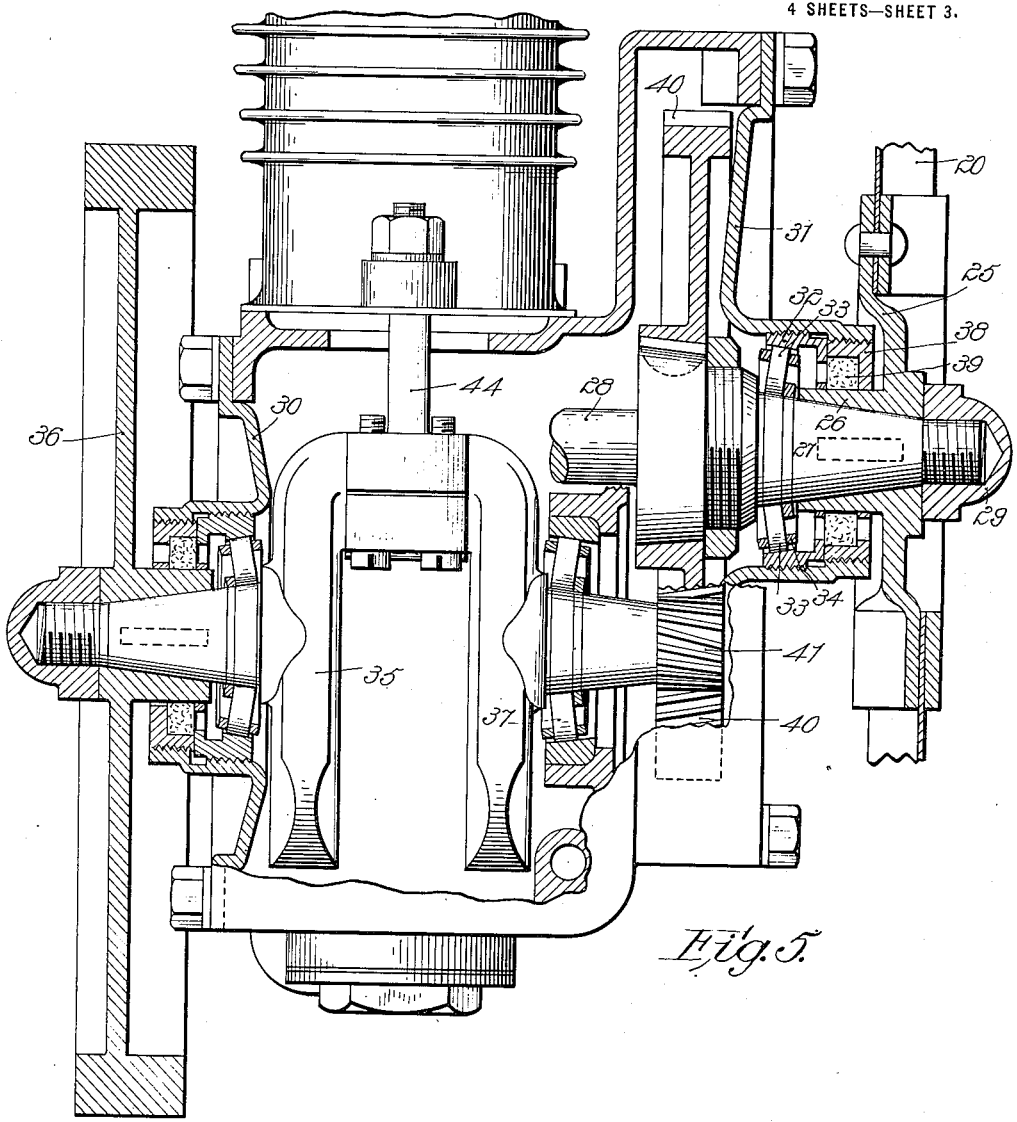
Fig. 5 is a transverse vertical section through the engine of the motor wheel.

The hub of the wheel 20 is in the form of a circular plate 25 riveted in position as illustrated. The circular plate 25 is provided with an integral boss 26, provided with a conical bore in which is keyed the conical end 27 of a shaft 28, the other end of said shaft being mounted in suitable roller bearings located on the side of the engine frame-work opposite the wheel 21. The wheel 21 is securely positioned upon the shaft 28 by a cap nut 29 threaded upon the right end of the shaft 28 (Fig. 5). As will more fully hereinafter appear the shaft 28 serving as the axle of the pusher wheel also serves as the cam-shaft for the pusher motor. The engine frame is provided on opposite sides thereof with removable cover plates 30 and 31, retained in position by bolts or other equivalent means. The cover plates referred to are preferably stamped from sheet metal and are conically dished to provide strength and rigidity. By providing openings on the opposite sides of the motor frame-work and by providing cover plates for said openings as described, the engine crank-shaft may be inserted through the opening closed by the cover plate 30 and the pusher axle or cam-shaft 28 may be inserted through the opening closed by the cover plate 31. The cover plates 30 and 31 are preferably given a circular contour whereby the surfaces of the engine crank case, or housing, to which they are bolted may be circular, thus facilitating and cheapening the machine operations by which these surfaces are finished. Most of the machine surfaces of the engine casing, or housing, are concentric with respect to the surfaces which must be machined for the accommodation of the cover plates, thereby further simplifying and cheapening the machine work of manufacture. The closure plate 31 has threaded therein a ring 32 provided with an interior conical surface concentric and parallel with the conical surface 27 of the axle or cam-shaft 28. Interposed between roller races afforded by the ring 32 and the end 27 of the shaft 28 is a plurality of rollers 33 preferably confined in a suitable cage 34 as illustrated in Fig. 5.

The motor crank-shaft illustrated at 35 is provided with a light fly-wheel 36 and has the left end thereof (Fig. 5) mounted in an adjustable roller bearing substantially like the adjustable roller bearing of the axle or cam-shaft 28 hereinbefore described. It will be noted that the right end of the crank shaft 35 (Fig. 5) is provided with a suitable conical surface coöperating with a non-adjustable roller bearing indicated as a whole by the reference numeral 37. The left end of the axle or cam-shaft 28 (Fig. 5) is suitably mounted in a non-adjustable roller bearing (not shown) substantially like the non-adjustable roller bearing 37 with which the crank-shaft 35 is provided.

Attention is directed to the fact that the axle or cam-shaft 28 and the crank-shaft 35 are provided with conical extensions by means of which connections with the motor wheel and fly wheel are effected and the geometrical surfaces of these conical extensions are extended to serve as the conical bearing members upon which the rollers of the adjustable bearings ride. A single grinding operation, therefore, is sufficient to provide both the bearing surface and the surface engaged by the hub of the wheel with which connection is made.

The adjustable bearings with which the crank-shaft 35 and axle or cam-shaft 28 are provided, are equipped with externally threaded lock nuts 38 which serve not only to maintain the bearings in alinement but which also serve as housings for felt oil rings or washers 39. It will be seen that the structure just described is designed to permit the adjustment of both bearings of each shaft by the adjustment of the bearing at one end only.

The axle or cam-shaft 28 has fixed thereon a gear 40 meshing with a pinion 41 carried by the engine crank-shaft. The connection between the crank-shaft and axle or cam-shaft is in an 8 to 1 ratio, for a reason to be subsequently explained. Inasmuch as the motor wheel is keyed upon the axle or cam-shaft 28 it will be seen that the gearing just described serves as a transmission through which the pusher wheel is driven from the engine crank-shaft.

Bolted, or otherwise secured, upon the engine crank-case is a working cylinder 42 in which reciprocates a working piston 43 operatively connected with the crank-shaft by the usual pitman rod 44. The cylinder 42 is provided with a suitable spark plug 45 and intake and exhaust valves shown respectively at 46 and 47.

The engine is provided with a suitable ignition magneto 48 disposed in an opening in the engine frame just forward of the cylinder and is provided with a circular boss or flange surrounding one end of the magneto shaft, the engine frame being provided with a corresponding surface 49, as is most clearly illustrated in Fig. 7, to which the magneto is bolted. As most clearly illustrated by dotted lines in Fig. 3 the magneto shaft is provided with a driving pinion 50 which meshes with the cam-shaft gear 40, the method of mounting the magneto being such as to assure its alinement and the proper spacing between its shaft and the axis of the cam-shaft. The engine frame is arranged in such manner as to expose the mechanism of the magneto thereby making it readily accessible for adjustment or repair. The means by which the magneto is mounted makes it possible also to remove it entirely from the engine without disturbing or removing other parts in case such removal becomes necessary. One terminal of the magneto is grounded and the other terminal is connected by means of a suitable conductor 51 with the insulated terminal of the spark plug 45, thereby reducing the wiring of the ignition system to a minimum and confining the magneto and the electrical connection between it and the spark plug to a position within the dish of the pusher wheel, and thus protecting it from water in case of rain and from the mud-splash of the bicycle or motor wheels.

The inlet valve 46 of the engine cylinder is of the usual type and is provided with a spring normally holding it upon its seat, the valve being opened when suction is created in the engine cylinder in a manner well known to those skilled in the art of internal combustion engine construction. The exhaust valve 47 has attached thereto a rod 52 passing through a boss 53 formed integral with the engine cylinder. Carried by the rod 52 near the lower end thereof is a collar or washer 54 which serves as an abutment for a spring 55 normally tending to hold the exhaust valve 47 upon its seat. The end of the spring 55 opposite the washer or collar 54 abuts against a forked spacer 56 which keeps the spring in a position a considerable distance from the valve rod 52 and the boss 53, thereby permitting air to circulate freely between the convolutions of the spring to keep it cool and thus to preserve its temper. The spacer is in the form of an inexpensive stamping.

As is most clearly illustrated in Fig. 3 the exhaust valve is operated by a plunger 57 which in turn is operated by a four-toothed cam 58 fixed upon the cam-shaft 28. It will be understood that every time the plunger 57 is operated by the cam 58, the exhaust valve 47 will be moved to its open position against the tension of its associated spring 55.

As is most clearly illustrated in Figs. 1 and 6, the carbureter 59 is bolted or otherwise secured directly to the valve casing of the engine thus dispensing with a manifold and securing an advantage in carburation due to the heat of the engine. As is most clearly shown in Fig. 6 the corbureter is provided with a piston throttle valve 60 normally held in open position by means of a coiled spring 61. The position of the piston valve 60 is controlled by means of a single wire 62 which runs through a flexible tube 63 to a controller mounted upon the handle-bar of the bicycle. Inasmuch as such controllers are well known to persons familiar with motorcycle construction, it is not deemed necessary to illustrate such a controller in the drawings. The wire 62 is led downward through the carbureter and passes through an aperture in a lever 64 having one end thereof pivoted at 65 to a portion of the engine frame-work. The free end of the lever 64 is interposed between the valve rod 52 and the plunger 57. The wire 62 is provided at its lower end with a shoulder 67 arranged to engage the lever 64 when the throttle valve 60 is moved to closed position. The construction just described facilitates starting of the engine inasmuch as the throttle valve may be closed to prevent the admission of fuel to the engine cylinder at the same time opening the exhaust valve 47. When this condition exists the bicycle may readily be pedaled and no compression is created within the engine cylinder. When sufficient speed has been attained the throttle valve is opened whereupon the exhaust valve 47 may perform its ordinary function and the engine may operate. The several parts are preferably arranged so that the exhaust valve is permitted to become seated before the piston throttle valve of the carbureter permits any fuel to pass into the engine cylinder. In like manner when the wire 62 is moved against the tension of the throttle valve spring the throttle valve is entirely closed before the exhaust valve is unseated due to the connection between the throttle valve and lever 64.

The engine frame is provided with front and rear extensions illustrated respectively at 69 and 70'. The forward projection 69 is conformed to provide two chambers 70 and 71, separated by a suitable wall 72. Secured to the projection 69 by stud bolts or other equivalent means, is a cast and slightly dished plate 73 having an arm 74 extending forwardly from the projection 69. Interposed between the plate 73 and the projection 69 of the engine frame is a plate 75 illustrated in detail in Figs. 8 and 9, this last mentioned plate having a plurality of relatively large apertures 76, affording communication between the chamber 70 and the space between the plates 73 and 75. A plurality of relatively small apertures 77 in the plate 75 afford communication between the chamber or recess 71 and the space between the plates 73 and 75, as most clearly illustrated in Fig. 9. A pipe 78 affords communication between the chamber 70 and the exhaust port of the engine. A passage 79 affords communication between the chamber 71 and the atmosphere. It will be understood that the parts just described constitute a muffler, the exhaust gases taking the path indicated by the arrows in Fig. 9.

The rear projection 70' of the engine frame serves as a reservoir for lubricating oil, the lubricating oil being admitted to the space within the projection 70' through an opening normally closed by a suitable plug 80. A passage 81 leads from the bottom of the oil reservoir to a space in the engine crank case slightly below the normal oil level therein. It will be understood that the oil reservoir is tight and that the crank case is capable of retaining a considerable quantity of lubricating oil in the bottom thereof in order that the operating parts of the engine may be lubricated by the splashing of the oil within the crank case. When the level of the oil in the crank case falls below the orifice of the oil passage 81 air bubbles up through the oil reservoir to permit the flow of oil into the crank case. As soon as a sufficient quantity of oil has thus been permitted to pass into the crank case the oil in the crank case will submerge the orifice of the passage 81 and thus prevent the further flow of lubricating oil. The oil reservoir is preferably provided with an outlet opening normally closed by a plug 82. The cam mechanism 58 for operating the exhaust valve is so designed that it is lubricated by the oil splash within the crank case.

Secured to the projection 70' as most clearly illustrated in Figs. 1 and 3, is a rearwardly projecting arm 83 which serves to support one end of a mud-guard 84 passing over the pusher wheel. The other end of the mud-guard 84 is supported by the forwardly projecting arm 74 of the plate 73 as is most clearly illustrated in Figs. 1 and 3.

Removably mounted upon the mud-guard 84, as is most clearly illustrated in Figs. 3 and 4 is a fuel tank 85, connection between the fuel tank and the carbureter being established by a tube 86. A stop cock 87 may be interposed in the connection between the fuel tank and the carbureter.

The means for connecting the motor wheel of my invention with a standard bicycle will now be described.

Having one end thereof retained upon the axle of the rear wheel of the bicycle and the other end thereof clamped to the bicycle frame by means of a bracket or clamp 88, is a bar 89 having an offset portion carrying a bracket 90 through which passes the lower end of a bar 91 having its upper end clamped to the bicycle frame at 92. The inner face of the bar 89 is concaved so as to embrace the frame rod of the bicycle. The clamping member 88 in addition to its function of securing the bar 89 to the frame serves as a reinforcement for the bicycle frame. The bar 91 is reduced in cross-section at 93 and carries at this point the vertical cylindrical portion 94 of a casting, illustrated in detail in Fig. 10, the casting being retained in position upon the lower end of the bar 91 by means of a nut 95 as illustrated. The casting shown in Fig. 10 comprises in addition to the vertical cylindrical portion 94 a horizontal cylinder portion 96 and an eye 97, the function of which will presently be explained. Passing through the horizontal cylinder portion 96 of the casting referred to is a bolt 98 which hingedly connects the casting with the forward end of the arm 74 of the plate 73 which in turn is fixed to the forward extension of the engine frame. Thus a double pivotal connection is provided between the pusher wheel and the bicycle frame, the thrust of the motor being transmitted to the bicycle frame through this connection. In order to limit the permissible side-swing of the pusher relative to the bicycle frame the bar 89 carries a bracket 99 which in turn supports a rod 100 passing through the eye 97 of the casting illustrated in detail in Fig. 10. A coil spring 101 acting between the bracket 99 and the eye 97 limits the side-swing of the motor wheel in one direction, and the spring 102 acting between the eye 97 and the abutment carried at the free end of the rod 100 serves to limit the side-swing of the motor wheel in the opposite direction. Attention is called to the fact that the lower end of the bar 91 and the vertical sleeve 94 of the two way connector are substantially in a vertical plane running through the central part of the motor wheel. By means of this construction there is no tendency for the motor wheel to turn itself out of alinement with the bicycle when traveling in a straight line even though the connecting arm 74 is disposed outside of the above mentioned plane.

Figure 11:
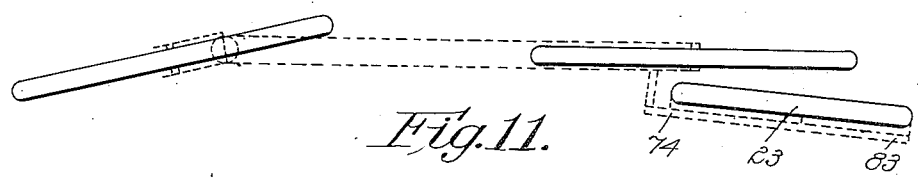
Fig. 11 shows diagrammatically a position which the motor wheel may assume with respect to a bicycle.

From the above description it will be seen that I have provided a motor wheel which may be operatively connected with the ordinary manually operated bicycle, to lend to the bicycle all of the advantages of an ordinary motorcycle. Due to the novel connection between the motor wheel and the bicycle, the bicycle when provided with the motor wheel is no harder to guide than it would otherwise be, and a bicycle provided with the motor wheel is superior in its riding qualities to an ordinary motorcycle, this being due partly to the fact that the jar incidental to the operation of the engine is not transmitted to the bicycle frame as is the case in the ordinary motorcycle constructions wherein the power plant is supported by the machine frame. As is clearly illustrated in Fig. 11 the motor wheel is free to assume the proper angle with respect to the rear wheel of the bicycle whenever the direction of the bicycle is changed.

While I have illustrated my invention in the particular embodiment herein shown and described, I appreciate the fact that a great many changes may be made therein without departing from the spirit of my invention.

What I claim as new and desire to secure by Letters Patent of the United States is—

1. A device of the class described comprising a motor wheel having an engine supported by the wheel and connected in driving relation thereto, and mechanism comprising a double pivot for operatively connecting the motor wheel with a bicycle frame.

2. A device of the class described comprising in combination a motor wheel having an engine supported thereby and connected in driving relation thereto, and mechanism comprising horizontal and vertical pivots for operatively connecting the motor wheel with a bicycle frame.

3. A device of the class described comprising a motor wheel having an engine supported thereby and connected in driving relation thereto, and thrust-transmitting mechanism for operatively connecting the motor wheel with a bicycle frame, said thrust-transmitting mechanism comprising a vertical pivot whereby the motor wheel may at all times assume the proper position with respect to the bicycle wheels.

4. A device of the class described comprising in combination a motor wheel having an engine supported thereby and connected in driving relation thereto, thrust-transmitting mechanism for connecting the motor wheel with a bicycle frame, said thrust-transmitting mechanism comprising a vertical pivot whereby the motor wheel may at all times assume the proper position with respect to the wheels of the bicycle, and spring mechanism for limiting the permissible side swing of the motor wheel about said pivot.

5. A device of the class described comprising in combination a motor wheel having an engine supported thereby and connected in driving relation thereto, thrust-transmitting means for operatively connecting the motor wheel with a bicycle frame, said thrust-transmitting means comprising vertical and horizontal pivots, and spring mechanism for limiting the permissible side swing of the motor wheel on said vertical pivot.

6. A device of the class described comprising a dished driving wheel, an engine supported by the dished driving wheel and connected in driving relation thereto, the center of gravity of the engine and driving wheel being located approximately in the plane of the tread of the driving wheel, and means for transmitting thrusts from the driving wheel to a bicycle frame, said thrust-transmitting means comprising a double pivotal connection.

7. Apparatus of the class described comprising a driving wheel, an engine suported by the driving wheel and connected in driving relation thereto, the center of gravity of the driving wheel and engine being located approximately above the road-engaging portion of the wheel tread, and means for transmitting thrusts from the driving wheel to a bicycle frame, said thrust-transmitting means comprising vertical and horizontal pivots.

8. A device of the class described comprising a driving wheel, an engine supported by the driving wheel and connected in driving relation thereto, the center of gravity of the wheel and engine being located approximately over the road-engaging portion of the wheel tread, means for transmitting thrusts from the driving wheel to a bicycle frame, said thrust-transmitting means comprising substantially vertical and horizontal pivots, and spring mechanism for limiting the side swing of the driving wheel about said vertical pivot.

9. A device of the class described comprising a driving wheel, an engine supported by the driving wheel and connected in driving relation thereto, the center of gravity of the driving wheel and engine being located substantially directly over the road-engaging portion of the wheel tread, means for transmitting thrusts from the driving wheel to the frame of a bicycle, said thrust-transmitting means comprising a substantially vertical pivot, and spring mechanism for limiting the side swing of the driving wheel about said vertical pivot.

10. A device of the class described comprising a driving wheel, an axle for said driving wheel, an engine supported on the axle so that the axle may turn relative thereto, a crank shaft for said engine, means operatively connecting the crank shaft with the driving wheel, and means for operatively connecting the engine frame with a bicycle frame, said connecting means comprising vertical and horizontal pivots.

11. A device of the class described comprising a driving wheel, an axle for said driving wheel, an engine mounted on said axle, a crank shaft for said engine, means for operatively connecting the crank shaft with the driving wheel, the center of gravity of the driving wheel and engine being located approximately directly over the road-engaging portion of the wheel tread, and means for transmitting thrusts from the engine frame to the frame of a bicycle, said thrust-transmitting means comprising a pair of pivots substantially at right angles to each other.

12. A device of the class described comprising in combination a driving wheel, an axle for said driving wheel, an engine mounted on said axle so that the axle may rotate with respect thereto, a crank shaft for said engine, means for connecting the crank shaft in driving relation to the driving wheel, and means for transmitting thrusts from the engine frame to a bicycle frame and for retaining the engine frame in fixed position so that the driving wheel is rotated when the engine is operated, said thrust-transmitting means comprising a vertical pivot, and spring mechanism for limiting the side swing of the driving wheel about said vertical pivot.

13. In a device of the class described, the combination of a bicycle having a frame, a rear wheel mounted in the frame and a front wheel pivotally mounted in the frame for steering purposes, a motor wheel having a frame and a motor therein for driving the wheel, and means connecting the motor wheel frame with the bicycle frame to position the motor wheel at the side of the rear wheel of the bicycle so as to permit the motor wheel to swing laterally with respect thereto.

14. In a device of the class described, the combination of a bicycle having a frame, a rear wheel mounted in the frame and a front wheel pivotally mounted in the frame for steering purposes, a motor wheel having a frame and a motor therein for driving the wheel, means connecting the motor wheel frame with the bicycle frame to position the motor wheel at the side of the rear wheel of the bicycle so as to permit the motor wheel to swing laterally with respect thereto, and means for limiting the lateral swing of the motor wheel.

15. In a device of the class described, the combination of a bicycle having a frame, a rear wheel mounted in the frame and a front wheel pivotally mounted in the frame for steering purposes, a motor wheel having a frame and a motor therein for driving the wheel, means connecting the motor wheel frame with the bicycle frame to position the motor wheel at the side of the rear wheel of the bicycle so as to permit the motor wheel to swing laterally with respect thereto, and resilient means for limiting the lateral swing of the motor wheel.

16. In a device of the class described, the combination of a motor wheel and a frame therefor, and means for connecting the motor wheel frame with a bicycle frame to position the motor wheel at the side of the rear wheel of a bicycle so as to permit the motor wheel to rise or fall and to swing laterally with respect to the rear wheel of the bicycle.

17. In a device of the class described, the combination of a motor wheel and a frame therefor, means for connecting the motor wheel frame with a bicycle frame to position the motor wheel at the side of the rear wheel of a bicycle so as to permit the motor wheel to rise or fall and to swing laterally with respect to the rear wheel of the bicycle, and means for limiting the side swing of the motor wheel.

18. In a device of the class described, the combination of a motor wheel and a frame therefor, means for connecting the motor wheel frame with a bicycle frame to position the motor wheel at the side of the rear wheel of a bicycle so as to permit the motor wheel to rise or fall and to swing laterally with respect to the rear wheel of the bicycle, and resilient means for restricting the side swing of the motor wheel.

19. In a device of the class described, the combination of a motor wheel and a frame in which the motor wheel is mounted, and means for connecting the motor wheel frame with a bicycle frame to locate the motor wheel outside the plane of the rear wheel of the bicycle, said means including an articulation adapted to swing the motor wheel out of parallelism with the bicycle wheel when rounding a curve.

20. Mechanism of the class described comprising in combination means arranged to be secured at three points to a bicycle frame, a motor wheel having an engine supported thereby and connected in driving relation thereto, mechanism for transmitting thrusts from the motor wheel to said first-mentioned means, said mechanism comprising a pair of pivots substantially at right angles to each other, and spring mechanism for limiting the side swing of the motor wheel about one of said pivots.

21. Apparatus of the class described comprising in combination means arranged to be secured at three points to a bicycle frame, a motor wheel having an engine supported thereby and connected in driving relation thereto, and mechanism for transmitting thrusts from the motor wheel to said first-mentioned means, said thrust-transmitting mechanism comprising substantially vertical and horizontal pivots whereby the jar incidental to the operation of the engine is not transmitted to the bicycle frame and whereby the motor wheel may at all times assume a proper angular position with respect to the bicycle wheels.

22. A device of the class described comprising a dished driving wheel, an axle for said driving wheel, an engine mounted on said axle and located in the dished side of the wheel, said engine comprising a crank shaft connected in driving relation to the wheel and a frame having front and rear projections, a mud guard supported by said front and rear projections, and means interposed between the forward projection and the frame of a bicycle whereby the thrust of the driving wheel is transmitted to the bicycle to drive the latter, said means comprising mechanism adapted to permit the articulation of the driving wheel and frame in a plane other than that of the rim of the driving wheel.

23. A device of the class described comprising a motor wheel, an axle for said motor wheel, an engine mounted on said axle and connected in driving relation to said motor wheel, said engine comprising a frame having front and rear projections, a mud guard carried by said projections, and means for connecting the forward projection with the frame of a bicycle to transmit the thrust of the motor wheel to the bicycle, said means comprising mechanism for articulating the motor wheel and the engine in a plane other than that of the rim of the wheel.

24. A connector for a motor carrying vehicle driving wheel of that class in which the vehicle and the motor are supported independently of each other, including the combination of a member adapted for attachment to a vehicle, a member connected to the first mentioned member and adapted for relative up and down movements substantially without resistance, and means for permitting limited lateral movements of one of said members, whereby the connected wheel may automatically assume a position tangent to a curve parallel with the curve along which the vehicle is traveling.

25. The combination with a vehicle, of an auxiliary traction wheel, a motor mounted upon and operatively connected to rotate said wheel, a connection between said auxiliary wheel and said vehicle, adapted to permit substantially free up and down movements of the wheel with reference to the vehicle, and means for allowing said wheel to turn laterally to a position tangent to a curve parallel with the curve along which the vehicle is traveling.

26. A pushing motor wheel attachment for a bicycle, including a pushing connector adapted to permit relative lateral turning movements of the motor wheel, in combination with means for resiliently holding the wheel normally in a plane parallel with the rear wheel of the bicycle.

27. An attachment for bicycles, including an arm provided with means for securing the same to a bicycle frame, in combination with a coupling swiveled to a downwardly projecting portion of said arm, resilient connections for limiting relative movements of said coupling, and a motor carrying traction wheel flexibly connected with said coupling to swing therefrom in a vertical plane.

28. The combination with a bicycle, of an auxiliary traction wheel, a motor mounted upon and operatively connected to rotate said wheel, a connection between said auxiliary wheel and the bicycle frame, adapted to permit up and down movements of the motor carrying wheel independently of the bicycle, said connection being also adapted to permit lateral turning movements of said wheel, and means for resiliently opposing said lateral movements in either direction from the line of travel.

29. The combination with a vehicle frame, of a laterally projecting arm having a coupling member mounted thereon to swing about a substantially vertical axis and provided with a stop, relatively fixed resilient cushions in the path of said stop to limit the swinging movements of said member upon said axis, and an auxiliary motor carrying traction wheel coupled to said member upon an axis transverse to the axis upon which said coupling member swings.

30. The combination with a bicycle frame having a sprocket shaft bearing and lower fork rods to receive the rear wheel, of a supporting bar, having its front end secured to both fork rods and its rear end secured to the rear wheel axle.

31. The combination with a bicycle frame having a sprocket shaft bearing and lower fork rods to receive the rear wheel, of a supporting bar, having its front end secured to both fork rods and its rear end secured to the rear wheel axle, and also having a concave portion partially embracing one of said frame rods.

32. A pushing attachment for bicycles, including the combination with a motor carrying traction wheel, of a supporting connection between such wheel and the bicycle frame adapted to permit relative vertical and lateral swinging movement of the traction wheel, said supporting connection being so located that the axis of the lateral swinging movement of the traction wheel is substantially in the central vertical plane of said wheel.

33. The combination with a bicycle frame, of a traction wheel, a motor mounted upon one side thereof, and operatively connected to drive the wheel, and connections between the wheel and frame adapted to hold the motor from rotating with the wheel; said connections including means for permitting movement of the wheel and motor in a vertical plane relatively to said frame and also including means for permitting lateral steering movements, whereby said traction wheel may follow a curved path.

34. The combination with a bicycle main frame, of a traction wheel, a motor carrying frame supported thereby at one side of the wheel and means for connecting said motor carrying frame with the bicycle frame, said connecting means including a pivotal articulation adapted to allow the wheel to turn upon a steering axis, whereby it may follow a curving path; said connecting means being also adapted to allow the traction wheel, motor carrying frame and motor to swing in a vertical plane relatively to the bicycle main frame.

35. In combination, a bicycle, independent driving apparatus therefor including a driving wheel and universally flexible means for connecting said bicycle and apparatus together, said means normally holding the driving wheel substantially parallel to the bicycle.

36. In combination, a bicycle, a driving wheel independent thereof, a power plant on said driving wheel for driving the same, universally flexible means for connecting the driving wheel to the bicycle, said means normally maintaining the driving wheel substantially parallel to the bicycle but permitting deflection of said wheel out of parallel relation thereto, said means restoring said driving wheel to normal position substantially parallel to the bicycle after being deflected therefrom.

37. In combination, a bicycle, a driving wheel independent thereof, a power plant carried by said wheel for driving the same and elastic means connecting the driving wheel to the bicycle, said elastic means restoring said driving wheel to normal position substantially parallel to the bicycle when the driving wheel has been deflected therefrom.

38. In bicycle propelling apparatus, the combination of a wheel rim, a dish-shaped member connected at its periphery to the rim of the wheel, a spindle at the center of said member, a frame connected to said spindle, a hydro-carbon engine in said frame on one side of the spindle, a magneto in said frame on the other side of said spindle, devices through which the engine drives the magneto and the spindle, said engine, magneto and frame being connected to the wheel rim with the weight thereof distributed substantially equally on the two sides of the spindle and the vertical central plane of the wheel rim.

39. In combination, a bicycle including handle bars and propelling means which include foot operated pedals, propelling apparatus including a power plant and a motor wheel independent of the bicycle, means for connecting the propelling apparatus to the bicycle, whereby said propelling apparatus drives the bicycle independently of the pedals, said power plant including an internal combustion engine, and means controlled from the handle bars for relieving the internal load of said internal combustion engine during starting, whereby the same can be started through the pedal operation of the bicycle.

40. In combination, a bicycle of the class wherein balance is maintained by the rider, including means through which the operator pedals the bicycle, independent propelling apparatus for said bicycle, including a motor wheel and a power plant, means for connecting the independent propelling apparatus to the bicycle through which the said apparatus propels the bicycle, said means holding said propelling apparatus normally with the motor wheel parallel to the rear wheel of the bicycle, and mechanism for mounting the power plant upon the motor wheel with the center of gravity of the power plant at the center of gravity of the motor wheel.

41. In an auto wheel, the combination of a rim, a dish-shaped member connected at its periphery to the rim of the wheel, a spindle at the center of said member, a frame, means to connect the frame to the spindle, a hydro-carbon engine in said frame on one side of the spindle, a magneto in said frame on the other side of the spindle, a shaft mounted in the frame, means to connect the engine to the shaft, means to connect the magneto to the shaft and mechanism through which the wheel is rotated from the shaft by the engine, said engine, magneto and frame being connected to the spindle with the weight distributed partly on each side of the vertical central plane of the wheel.

42. In a bicycle propelling apparatus, the combination of a wheel rim, a dish-shaped member connected at its periphery to the rim of the wheel and bulging at the center from the central plane of the rim, a spindle in the center of the dish-shaped member extending substantially perpendicularly to the central plane of the rim in a direction opposite that in which the dish-shaped member bulges, a power plant frame associated with the spindle, a hydrocarbon engine in the frame on one side of the spindle, a magneto in the frame on the other side of the spindle, means through which the engine drives the spindle, including a spiral gear wheel and a shaft about which there are spiral threads meshing with the teeth of said wheel, the weight of the frame, magneto, engine and last named means being partly on one side and partly on the other side of the central plane of the wheel rim.

43. In combination, a bicycle including a frame, a driving wheel, a power plant frame supported from said wheel, a power plant for driving said wheel mounted in said frame, a bracket connected to the bicycle frame, mechanism for connecting said driving wheel to said bracket normally holding said wheel substantially parallel to said bicycle, said mechanism including means permitting the wheel to be deflected out of parallelism with the bicycle and a shaft to which said wheel is pivoted to rise and fall.

44. In combination, a bicycle including a frame, a bracket connected to said frame, a motor wheel independent of the bicycle for driving the same, said motor wheel including a power plant frame and a power plant in said frame, connecting means for connecting the power plant frame to said bracket including elastic means for restoring said driving wheel to normal position substantially parallel to the bicycle when the driving wheel has been deflected therefrom, and a shaft connected to the bracket to which the driving wheel is pivoted to rise and fall.

In witness whereof, I hereunto subscribe my name this 1st day of August A. D. 1914.

R. STANLEY SMITH.

Witnesses:
 F. B. Austin,
 A. H. Beckmann.